US010714807B2

(12) United States Patent
Blennius

(10) Patent No.: US 10,714,807 B2
(45) Date of Patent: Jul. 14, 2020

(54) STABILIZATION ARRANGEMENT FOR STABILIZATION OF AN ANTENNA MAST

(71) Applicant: SAAB AB, Linkoeping (SE)

(72) Inventor: Martin Blennius, Kullavik (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/461,838

(22) PCT Filed: Sep. 6, 2017

(86) PCT No.: PCT/SE2017/050880
§ 371 (c)(1),
(2) Date: May 17, 2019

(87) PCT Pub. No.: WO2018/093306
PCT Pub. Date: May 24, 2018

(65) Prior Publication Data

US 2019/0341670 A1 Nov. 7, 2019

(30) Foreign Application Priority Data

Nov. 18, 2016 (SE) ...................................... 1651508

(51) Int. Cl.
*G01C 19/16* (2006.01)
*G01C 19/20* (2006.01)
(Continued)

(52) U.S. Cl.
CPC ............. *H01Q 1/1235* (2013.01); *H01Q 1/18* (2013.01)

(58) Field of Classification Search
CPC ............................... H01Q 1/18; H01Q 1/1235
See application file for complete search history.

(56) References Cited

U.S. PATENT DOCUMENTS 2,477,574 A * 8/1949 Braddon ................ G01C 21/18 74/5.47
3,579,929 A * 5/1971 Holthenrichs ........... H01Q 1/18 52/1

(Continued)

FOREIGN PATENT DOCUMENTS

| | | | |
|---|---|---|---|
| EP | 0118729 | A1 | 9/1984 |
| FR | 2851680 | A1 | 8/2004 |
| JP | S62184377 | A | 8/1987 |

OTHER PUBLICATIONS

International Searching Authority, International Search Report and Written Opinion for PCT Application No. PCT/SE2017/050880, dated Nov. 13, 2017, 9 pages, Sweden.

(Continued)

*Primary Examiner* — Jake Cook
(74) *Attorney, Agent, or Firm* — Alston & Bird LLP

(57) ABSTRACT

A stabilization arrangement (10) for stabilizing an antenna mast (3), comprising an antenna mast (3) and a gyroscopic stabilizer device (12), wherein the gyroscopic stabilizer device (12) in turn comprises a flywheel (11), a flywheel axis (14), wherein the flywheel (11) is arranged about the flywheel axis (14), and a gimbal structure (13), wherein the flywheel (11) is suspended in the gimbal structure (13) and the gimbal structure (13) is configured to permit flywheel precession or tilting about at least one gimbal output axis (16). The gyroscopic stabilizer device (12) is fixedly arranged in connection to a first end portion (31) of the antenna mast (3) and the antenna mast (3) is fastenable to a supporting structure at a second end portion (32) of the antenna mast (3), wherein the gyroscopic stabilizer device (12) is configured to reduce movements in a plane perpendicular to the extension of the antenna mast (3).

18 Claims, 6 Drawing Sheets

(51) Int. Cl.

| | |
|---|---|
| ***G01C 19/38*** | (2006.01) |
| ***H01Q 1/12*** | (2006.01) |
| ***H01Q 1/18*** | (2006.01) |

(56) References Cited

U.S. PATENT DOCUMENTS

| | | | | | |
|---|---|---|---|---|---|
| 3,893,123 | A | | 7/1975 | Bieser | |
| 4,020,491 | A | | 4/1977 | Bieser et al. | |
| 4,334,226 | A | | 6/1982 | Eguchi et al. | |
| 4,433,337 | A | * | 2/1984 | Smith | H01Q 1/18 343/709 |
| 4,621,266 | A | | 11/1986 | Le Gall et al. | |
| 5,517,204 | A | * | 5/1996 | Murakoshi | H01Q 1/18 248/183.1 |
| 5,670,967 | A | * | 9/1997 | Sarjala | H01Q 1/18 343/757 |
| 2011/0007157 | A1 | | 1/2011 | Sekelsky et al. | |

OTHER PUBLICATIONS

European Patent Office, Extended European Search Report for Application No. 17872811.9, dated Apr. 24, 2020, 11 pages, Germany.

* cited by examiner

STABILIZATION ARRANGEMENT FOR STABILIZATION OF AN ANTENNA MAST

CROSS REFERENCE TO RELATED APPLICATIONS

This application is a National Stage Application, filed under 35 U.S.C. 371, of International Application No. PCT/SE2017/050880, filed Sep. 6, 2017, which claims priority to Swedish Application No. 1651508-2, filed Nov. 18, 2016; the contents of both of which are hereby incorporated by reference in their entirety.

BACKGROUND

Related Field

The present invention relates to a device for improving the stability of an extendable or elevated mast, particularly for improving radar performance of a radar system by improving the stability of the antenna mast. Although the invention will be described with respect to antenna masts, the invention is not restricted to this particular use but may also be used in order to improve the stability of other extendable masts.

Description of Related Art

High masts, such as extendable or in other way highly elevated antenna masts used for e.g. radar applications, electricity pylons or radio masts are exposed to significant forces due to continuous wind and/or wind gusts. If provided with an essentially horizontally rotating surface, such as a flat radar antenna, a parabolic disc or similar, hereinafter generally referred to as radar surface, the antenna mast is additionally exposed to oscillating forces as the surface exposed to wind varies with the rotations of the surface. This may cause that the mast starts to self-oscillate. If a mast starts to self-oscillate the top of the mast will periodically move significantly back and forth whereby the performance in terms of e.g. accuracy and sensitivity of e.g. a radar arranged at the top of the mast may be severely degraded. Self-oscillation may, if not counteracted, not only lead to that the performance of e.g. a radar, arranged at the top of the mast, is severely deteriorated, but may also lead to shortened lifetime of the mast or to that the mast breaks. Self-oscillations also expose the supporting or fastening structure of the mast, i.e. the structure the antenna mast is arranged to, for high loads which also might degrade and shorten the lifetime of the supporting structure. In severe cases the supporting structure might even collapse.

Today this problem generally is addressed by, in addition to looking at the aerodynamic properties of the mast, using thicker and/or stronger goods, which often adds weight and/or cost, and by strengthening the fastening arrangements of the antenna mast, which for many applications, such as when the antenna mast is applied on a vehicle, is an unfavorable approach.

Thus, there is need for improvements.

BRIEF SUMMARY

An object of the present invention is to provide a stabilization arrangement for stabilizing an antenna mast, or a similar stationary or extendable mast arrangement. This object is achieved by a stabilization arrangement according to the independent apparatus claim. Further aspects, advantages and advantageous features of the present invention are disclosed in the following description and in the dependent claims.

Yet an object of the present invention is to provide a method for counteracting that an antenna mast, or a similar stationary or extendable mast arrangement, goes into self-oscillation. That object is achieved by a method according to the independent method claim.

According to the present invention the stabilization arrangement for stabilizing an antenna mast comprises an antenna mast and a gyroscopic stabilizer device. The gyroscopic stabilizer device comprises a flywheel, a flywheel axis, wherein the flywheel is arranged to be rotatable about the flywheel axis, and a gimbal structure. The flywheel, rotatably arranged to the flywheel axis, is suspended in the gimbal structure and the gimbal structure is configured to permit precession, or tilting, of the flywheel about at least one gimbal output axis.

The gyroscopic stabilizer device is fixedly arranged in connection to a first end portion of the antenna mast and the antenna mast is fastenable to a supporting structure at a second end portion of the antenna mast. Thereby the gyroscopic stabilizer device is configured to reduce movements in a plane essentially perpendicular to the extension of the antenna mast.

The gyroscopic stabilizer device is preferably also provided with a flywheel drive motor configured to spin the flywheel at a high angular velocity around the flywheel axis.

According to one exemplary aspect the flywheel drive motor is arranged at one end of the flywheel shaft and includes a stator, fastened to the enclosure, and a rotor, fastened to the shaft. Various embodiments of motors could be used as flywheel drive motor. A gimbal structure can be seen as a pivoted support that allows backward and forward tilting of a suspended object about at least one axis.

With precession, also referred to as gyroscopic precession, is herein considered a change in orientation of the rotational axis of a rotating body. If the centre point of a rotating body is fixed precession can be seen as describing the movements that the body shows if freely arranged in a gyroscope. Another way to describe this movement, which also is used herein, is that the rotating body is tiltable around the gimbal output axes present. The movements and behaviour of a rotating body suspended in a gimbal structure, thus herein referred to precession or tilting around a number of axes, is considered to be part of common general knowledge. Thus, the herein used denomination “flywheel precession” is considered to have the same meaning as, and can thereby be replaced by “tilting of the flywheel”.

When being in an upright position the second end of the antenna mast is preferably the end of the antenna mast that is arranged to a vehicle, a building or like whereas the first end portion of the antenna mast is the end of the antenna mast that is intended to be elevated in relation to the second end of the antenna mast.

A flywheel spinning around a flywheel axis will create what generally is referred to as the gyro or gyroscopic effect. The gyroscopic stabilizer device will have a stabilizing effect in a plane perpendicular to the axis of rotation of the flywheel, thus in the plane perpendicular to the flywheel axis. For the present invention the gyroscopic effect provided by the spinning flywheel will have a stabilizing effect on the antenna mast. More precisely, the effect of the gyro effect is that, once you spin the flywheel of the gyroscopic stabilizer device around the flywheel axis, the flywheel axis strives to keep pointing in the same direction, i.e. in the vertical direction. When mounted in a gimbal structure permitting flywheel precession about at least one gimbal output axis the flywheel axis will, depending on what is allowed due to the number of gimbal output axes, continue pointing in the same, vertically upright direction. This in turn has the effect that the presence of the gyroscopic stabilizer device, which is mounted at a higher position of the mast, provides that the entire mast will strive to be in an upright position when moved in a lateral direction, whereby lateral movements in the plane perpendicular to the extension of the antenna will be counteracted, thus reduced. The physics behind the gyro effect is considered to be common general knowledge and will not be further discussed herein.

Reducing lateral movements in the plane perpendicular to the extension of the antenna mast, i.e. sideways, increases the stability of the radar. This in turn improves accuracy and sensitivity of the radar, enables even higher masts with higher operation heights to be used or eliminates the need of vehicle supporting means.

According to an exemplary aspect of the present invention, when the flywheel, which is rotatably arranged to the flywheel axis and is suspended in the gimbal structure, is in a resting position, the longitudinal direction of the flywheel axis is essentially vertically directed, and the flywheel is arranged to rotate perpendicular thereto. For many embodiments this means that the flywheel axis is arranged in a direction coinciding with the extension of the antenna mast when in a resting position.

According to another exemplary aspect of the present invention the gimbal structure is configured to permit flywheel precession about at least one gimbal output axis. According to another aspect of the present invention the gimbal structure is configured to permit flywheel precession about at least two gimbal output axes. The flywheel is preferably allowed to tilt in X-direction and Z-direction in relation to the horizontal plane. This will be disclosed more in detail in the detailed description.

For exemplary aspects of the present invention, where the gimbal structure is configured to permit precession about one gimbal output axis, this axis is preferably directed essentially in the same direction as the direction in which the antenna mast is most sensitive to oscillations.

This may e.g. be the transverse direction of a vehicle on which the gyroscopic stabilizer device is arranged. Thereby the gyroscopic stabilizer device provides the effect that the antenna mast, or similar, to which the gyroscopic stabilizer device is arranged, will be less prone to move and oscillate in a, taken in relation to exemplary embodiment when arranged to a vehicle, sideways direction. However, according to other aspects of the present invention it is also possible that the gimbal structure is configured to permit precession about one gimbal output axis which is directed essentially in parallel to the longitudinal direction of the vehicle on which the gyroscopic stabilizer device is arranged. For such aspects, the gyroscopic stabilizer device is most efficient for alleviating movements and oscillation in the longitudinal direction of the vehicle on which the gyroscopic device is arranged.

According to yet an exemplary aspect of the present invention the at least one gimbal output axis is provided with a motor device connected to the gimbal output axis. The motor device enables that the precession about the gimbal output axis may be actively controlled. The motor device may e.g. be in form of a servomotor, a stator/rotor motor or a hydraulic motor, but also other types of commonly known motor arrangements may be suitable. What is considered with active control is that the direction of the flywheel axis is actively adjusted, by means of e.g. the servomotor or a hydraulic motor, which enables that an even greater gyroscopic precessive torque counteracting mast oscillations may be generated by the gyroscopic device. Thus, by actively controlling the tilting of the flywheel axis by means of a motor device the gyroscopic moment created by the gyroscopic stabilizer device can be used more efficiently. Preferably, at least the gimbal output axis directed in the same lateral direction to which the antenna mast is most sensitive to oscillations is provided with the motor device.

The gyroscopic stabilization device is arranged by means of a connection arrangement to a first end portion of the antenna mast, whereas a second end portion of the antenna mast may be arranged to a supporting structure, such as e.g. a vehicle.

According to one exemplary aspect of the present invention the active control of the precession about the gimbal output axis, by means of the motor device, is based on sensor input. According to yet one aspect of the present invention the sensor input is provided by means of at least one sensor, wherein the sensor used may be an accelerometer, measuring the oscillations of the antenna mast, or an anemometer, measuring wind speed. According to other aspects more than one sensor is used, whereof at least one sensor may be an accelerometer or an anemometer. Other sensor(s) used may e.g. be a type of positioning sensor. According to yet an aspect of the present invention at least one sensor is arranged at the antenna mast, preferably to or adjacent to the connection arrangement. However, as is obvious for a person skilled in the art also other positions of sensors are suitable. It may however be preferable that the sensor(s), particularly if being an accelerometer, is/are arranged adjacent to the top of the antenna mast whereby movements of the antenna mast may be more easily detected. The use of at least one sensor enables improved active control of precession or tilting about the gimbal output axis whereby movements of the antenna mast can be more efficiently and more accurately counteracted. Thus, according to one exemplary aspect of the present invention the active control, enabled by means of the motor device and the at least one sensor, is configured to actively counteract that the antenna mast oscillates, i.e. goes into self-oscillation. The active control is preferably controlled and performed by means of a control unit or like.

As previously mentioned, the antenna mast may be provided with a rotating radar surface, whereby according to one aspect of the present invention the motor device is configured to be controlled in direct proportion to the rate of rotation of the rotating radar surface.

An exemplary advantage with this aspect of the present invention is that this method of active control is simple, robust and requires no sensor input from e.g. an anemometer (for measuring wind speed) or an accelerometer (for measuring the oscillations of the antenna mast).

However, according to yet an aspect of the present invention, wherein the antenna mast may be provided with a rotating radar surface and wherein the stabilization arrangement is provided with a sensor in form of an anemometer for measuring wind speed, the motor device is configured to be controlled by taking into account:

the rate of rotation of the rotating radar surface, and the wind speed measured by means of the anemometer.

An exemplary advantage with this aspect of the present invention is that this method of active control potentially can counteract oscillations of the antenna mast even more efficiently, especially at windy conditions.

According to yet an exemplary aspect of the present invention also wind gusts, also measured by means of an anemometer, are taken into account when controlling the motor device to counteract oscillations.

It is considered to be apparent that when herein referring to that oscillations are counteracted that also comprises that self-oscillation is counteracted.

According to yet an aspect of the present invention at least one gimbal output axis may also be provided with a precession brake. By providing a precession brake to at least one gimbal output axis the controllability of the precession about the gimbal output axis may be improved. Thus, either a motor device or a precession brake can be used to enable active control. Naturally also both a motor device and a precession brake can be used to enable active control.

According to further aspects of the present invention the antenna mast has an essentially circular cross section or cross sectional area. For antenna masts with circular cross section two Degrees of Freedom stabilization arrangement systems, i.e. 2 DOF stabilization arrangement systems, are preferably used since such systems are configured to counteract movements or equalize forces acting on the antenna mast in two directions in relation to the horizontal plane.

According to other aspects of the present invention the antenna mast may have an essentially elliptical cross section. An elliptical antenna mast is more prone to withstand forces generated e.g. by wind gusts, and suppress the occurrence of oscillations, in the direction in which the extension of the elliptical cross section is the largest than in the perpendicular direction, i.e. in the direction in which the elliptical cross section is the smallest. Thus, if an elliptical antenna mast is provided with a 1 DOF stabilization arrangement system the stabilization arrangement is preferably configured to withstand and suppress the occurrence of oscillations in the direction in which the elliptical cross section is the smallest, i.e. the only gimbal output axis is preferably arranged to point in the direction where the elliptical cross section is the smallest.

According to another aspect of the present invention the at least one gimbal output axis is provided with locking and unlocking functionality. At extension of the antenna mast, at lowering of the antenna mast or during transport, for embodiments of the present invention where the invention is implemented for an antenna mast arranged to a vehicle, it may be preferable to be able to stop the suspended flywheel from tilting about the at least one output axis by locking the gimbal output axis. This functionality is provided by means of a locking and unlocking functionality. The locking and unlocking functionality may be provided by means of an electrically controlled locking device or a mechanical locking device wherein the locking functionality may be enabled by means of a solenoid actuator. Additionally, during certain conditions, such as at really heavy wind, it may also be preferable to be able to stop the flywheel from tilting or pivoting.

Lowering of the antenna mast can also be applied in order to counteract self-oscillation or to prevent the system from over-compensating during active control.

According to yet an exemplary aspect of the present invention the stabilization arrangement is provided with a gyroscopic stabilizer failure warning device. The gyroscopic stabilizer failure warning device is configured to detect if the operations or functionality of the gyroscopic stabilizer device fails, i.e. if the gyroscopic stabilizer device stops working as intended or if the functionality of the gyroscopic stabilizer device is affected. Being aware of that the gyroscopic stabilizer of the stabilization arrangement is inoperative may be important since that e.g. may have the effect that the antenna mast has to be lowered to a lower operation height or that the accuracy or sensitivity of the radar antenna temporarily is affected.

Further, according to one exemplary aspect of the present invention the gyroscopic stabilizer device comprises a housing. The housing is configured to at least partly enclose the flywheel axis, the flywheel and the gimbal structure. According to aspects of the present invention also the flywheel drive motor is at least partially covered by the housing. The housing has the exemplary advantage that it protects the gyroscopic stabilizer device from e.g. dirt, rough weather and physical impact.

The present invention also refers to methods for counteracting oscillations, including e.g. self-oscillation, by using a gyroscopic stabilizer device. The method steps of the methods are preferably performed and/or controlled by a control unit or similar. The present invention further refers to a gyroscopic stabilizer device for use in a stabilization arrangement.

Thus, according to one exemplary aspect, the present invention further refers to a method for counteracting oscillations of an antenna mast provided with a stabilization arrangement according to any aspect, or a combination of aspects, of stabilization arrangements comprising motor devices as previously has been disclosed herein. The method comprises the method steps of:

- collecting sensor data by means of the sensor,
- determining how precessive torque, or precession torque, can be applied to at least one gimbal output axis, considering that the gimbal structure may have more than one gimbal output axis, in order to counteract that the antenna mast oscillates based on collected sensor data, and
- applying determined precessive torque to the at least one gimbal output axis by means of the motor device, whereby oscillations of the antenna mast is counteracted. The sensor data may e.g. be data collected by means of an accelerometer arranged to the antenna mast wherein the data indicates the spatial movements/accelerations of the antenna mast.

According to another exemplary aspect of a method for counteracting oscillations of an antenna mast provided with a stabilization arrangement, wherein the antenna mast is provided with a rotating radar surface, the method comprises the method steps of:

- collecting information regarding the current rate of rotation of the rotating radar surface and
- controlling the motor device in direct proportion to the rate of the rotation of the rotating radar surface by applying precessive torque to the at least one gimbal output axis by means of the motor device, whereby oscillations of the antenna mast is counteracted. Information regarding the current rate of rotation may e.g. be provided from the control unit.

According to one exemplary aspect of a method for counteracting oscillations of an antenna mast provided with a stabilization arrangement, wherein the antenna mast is provided with a rotating radar surface, and wherein the stabilization arrangement is provided with a sensor in form of an anemometer measuring wind speed, the method comprises the method steps of:

- measuring the current wind speed by means of the anemometer, and
- controlling the motor device in proportion to the rate of rotation of the rotating radar surface and the current wind speed by applying precessive torque to the at least one gimbal output axis by means of the motor device, whereby oscillations of the antenna mast is counteracted. Also considering the current wind speed may facilitate that the control method can be even more efficient, thus counteracting lateral movements of the antenna mast to even greater extent, e.g. as the wind picks up or varies significantly.

According to yet another exemplary aspect of a method for counteracting that an antenna mast of a stabilization arrangement oscillates, wherein the antenna mast is provided with a rotating radar surface and wherein the stabilization arrangement is provided with a sensor in form of an anemometer, the method further comprises the method step of:

considering:

the rate of rotation of the rotating radar surface, and the wind speed measured by means of the anemometer, when controlling the motor device in order to counteract oscillations of the antenna mast.

Thus, the above described methods may be realized by using a motor device, a precession brake, or a precession brake and a motor device in combination, in order to control the precessive torque applied. Herein, apply precessive torque is to be interpreted broadly and is considered to not only comprise adding precessive torque but also to comprise reducing precessive torque, as is done by means of the precession brake.

According to another exemplary aspect the present invention the present invention refers to use of a gyroscopic stabilizer device for stabilizing an antenna mast by fixedly arrange the gyroscopic stabilizer device directly to, or in connection to, the antenna mast, wherein the gyroscopic stabilizer device comprises a flywheel, a flywheel axis, wherein the flywheel is rotatably arranged about the flywheel axis, and a gimbal structure. The flywheel and flywheel axis are further suspended in the gimbal structure and the gimbal structure is configured to permit flywheel precession about at least one gimbal output axis. The gyroscopic stabilizer device is configured to reduce movements in a plane perpendicular to the extension of the antenna mast.

According to yet another exemplary aspect the present invention the present invention additionally refer to a gyroscopic stabilizer device for use in a stabilization arrangement, wherein the stabilization arrangement comprises an antenna mast and the gyroscopic stabilizer device. The gyroscopic stabilizer device is fixedly arranged directly to, or in connection to, the antenna mast, and wherein the gyroscopic stabilizer device in turn comprises: a flywheel, a flywheel axis, wherein the flywheel is rotatably arranged about the flywheel axis, a flywheel drive motor, wherein the flywheel drive motor is configured to spin the flywheel around the flywheel axis, and a gimbal structure. The flywheel and flywheel axis are further suspended in the gimbal structure and the gimbal structure is configured to permit flywheel precession about at least one gimbal output axis. The gyroscopic stabilizer device is arranged at a first end portion of the antenna mast and the antenna mast is fastenable or attachable to a structure at a second end portion of the antenna mast, wherein the gyroscopic stabilizer device is configured to reduce movements in the a plane perpendicular to the extension of the antenna mast.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the present invention as defined by the following claims.

BRIEF DESCRIPTION OF THE FIGURES

With reference to the appended drawings, below follows a more detailed description of exemplary embodiments of the present invention.

DETAILED DESCRIPTION OF VARIOUS EMBODIMENTS

The following description of exemplary embodiments of the present invention is presented only for purposes of illustration and should not be seen as limiting. The description is not intended to be exhaustive and modifications and variations are possible in the light of the above teachings, or may be acquired from practice of various alternative embodiments of the present invention. The examples discussed herein were chosen and described in order to explain the principles and the nature of various example embodiments and its practical application to enable one skilled in the art to utilize the exemplary embodiments in various manners, and with various modifications, as are suitable for the particular use contemplated. It should be appreciated that the aspects presented herein separately may be practiced in any combination with each other unless otherwise explicitly is stated.

Reoccurring reference signs refer to corresponding elements throughout the detailed description. When herein using reference signs indexed with a letter what is referred to is an exemplary embodiment of a feature that may be configured differently according to the present disclosure.

Figure 1A:
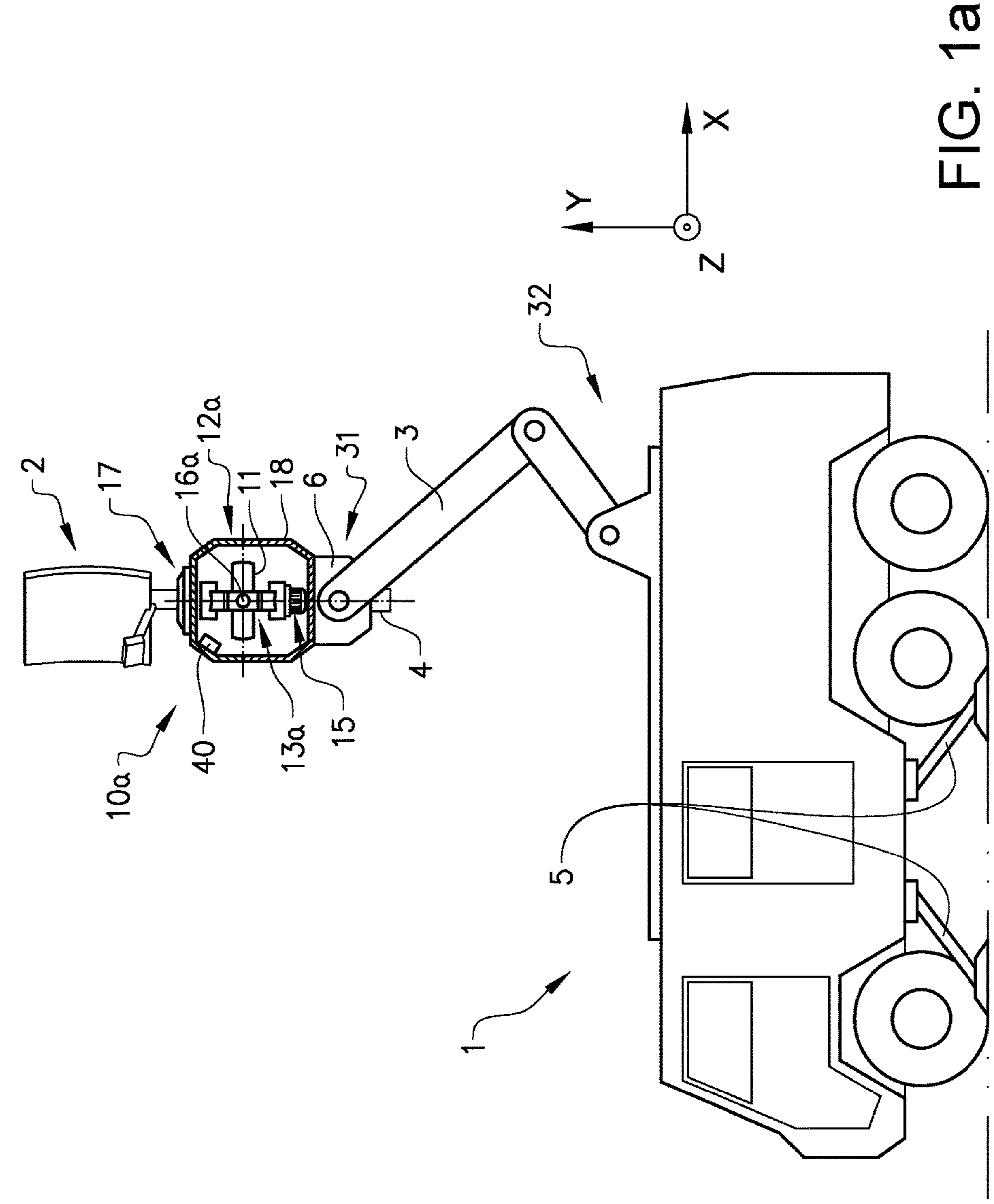
FIG. 1*a* discloses a first schematic view of a vehicle provided with a first exemplary embodiment of a stabilization arrangement, FIG. 1*b* discloses a second schematic view of a vehicle provided with a first exemplary embodiment of a stabilization arrangement, FIG. 2*a*, FIG. 2*b* and FIG. 2*c* disclose schematic views of exemplary embodiments of stabilization arrangements, FIG. 3*a* and FIG. 3*b* disclose schematic views of an exemplary embodiment of a 1 DOF gyroscopic stabilizer device, and FIG. 4*a* and FIG. 4*b* disclose schematic views of an exemplary embodiment of a 2 DOF gyroscopic stabilizer device.

FIG. 1*a* discloses a first schematic view of a vehicle 1 provided with a first exemplary embodiment of a stabilization arrangement 10*a*. The vehicle 1 is provided with vehicle supporting means 5 in form of outriggers. The stabilization arrangement 10*a* comprises an antenna mast 3, according to FIG. 1*a* in form of an extendable, articulate arm, and a gyroscopic stabilizer device 12*a*. The gyroscopic stabilization device 12*a* is arranged, by means of a connection arrangement 6, to a first end portion 31 of the antenna mast 3, and a second end portion 32 of the antenna mast 3 is arranged to a supporting structure, in FIG. 1*a* in form of the vehicle 1. The gyroscopic stabilizer device 12*a* in turn comprises a flywheel 11 arranged about the flywheel axis (not visible), a flywheel drive motor 15, in FIG. 1 in form of a stator/rotor motor, and a gimbal structure 13*a*. The flywheel 11 is configured to spin around the flywheel axis and the flywheel drive motor 15 is configured to at least initiate the spinning of the flywheel 11. The gyro effect provided by the spinning flywheel 11 will be discussed more in detail later on.

In FIG. 1*a* a gimbal structure 13*a* with one degree of freedom (1 DOF) is disclosed wherein the gimbal structure 13*a* has a first gimbal output axis 16*a*. Referring to the systems of coordinates indicated in FIG. 1*a*, the first gimbal output axis 16*a* in FIG. 1*a* is directed in parallel to an indicated Z-axis, perpendicular to an indicated Y-axis and an indicated X-axis, and is therefore just indicated by a circle, representing the axis in cross section. (Please see FIGS. 3*a* and 3*b* for further clarification.) The flywheel 11 is suspended in the gimbal structure 13*a*, whereby the gimbal structure 13*a* is configured such that the flywheel 11, including flywheel axis and flywheel drive motor 15, are tiltable around the first gimbal output axis 16*a*. Such movement is herein generally referred to as precession, and is not limited to refer to movements around one axis.

The gyroscopic stabilizer device 12*a* is enclosed by a housing 18. A rotating radar surface 2, such as e.g. a radar antenna, is arranged to the housing 18 by a rotation arrangement 17, enabling mechanical rotation of the rotating radar surface 2, and thereby enabling the radar antenna to transmit and receive electromagnetic waves in 360 degrees. The stabilization arrangement 10*a* is further provided with a sensor 4, preferably in form of an accelerometer or an anemometer.

Antenna masts, such as the extendable, articulate arm disclosed in FIG. 1*a*, are exposed to significant forces due to continuous wind and/or wind gusts. If provided with a rotating radar surface the antenna mast is additionally exposed to oscillating forces as the surface exposed to wind varies with the rotations of the rotating radar surface. This may cause the mast to self-oscillate. Self-oscillation makes the top of the mast to move periodically, whereby the performance of e.g. a radar arranged at the top of the mast will be severely deteriorated, and, if not counteracted, may lead to that the mast eventually breaks. The self-oscillating problem may e.g. be addressed by using thicker and/or stronger goods, by strengthening the fastening arrangements of the antenna mast or, if the antenna mast is arranged on a vehicle, by providing the vehicle with vehicle supporting means.

Due to the presence of the gyroscopic stabilizer device 12*a*, comprising the spinning flywheel 11, a gyroscope is formed providing a gyro effect. Due to the gyro effect forces acting to equalize the movements of the antenna mast 3 will be formed whereby essentially lateral movements, such as oscillations, of the antenna mast 3 are counteracted and thereby that the antenna mast 3 goes into self-oscillation is counteracted.

It is desirable to arrange the gyroscopic stabilizer device 12*a* as close to the source of movements/oscillations as possible, thus preferably as close to the rotating radar surface 2 as possible. It is also preferable that, when in a resting position, the longitudinal direction of the flywheel axis coincides with the imaginary longitudinal axis of the antenna mast 3, wherein the gyroscopic moment acts symmetrically with the neutral line of the antenna mast 3.

Figure 1B:
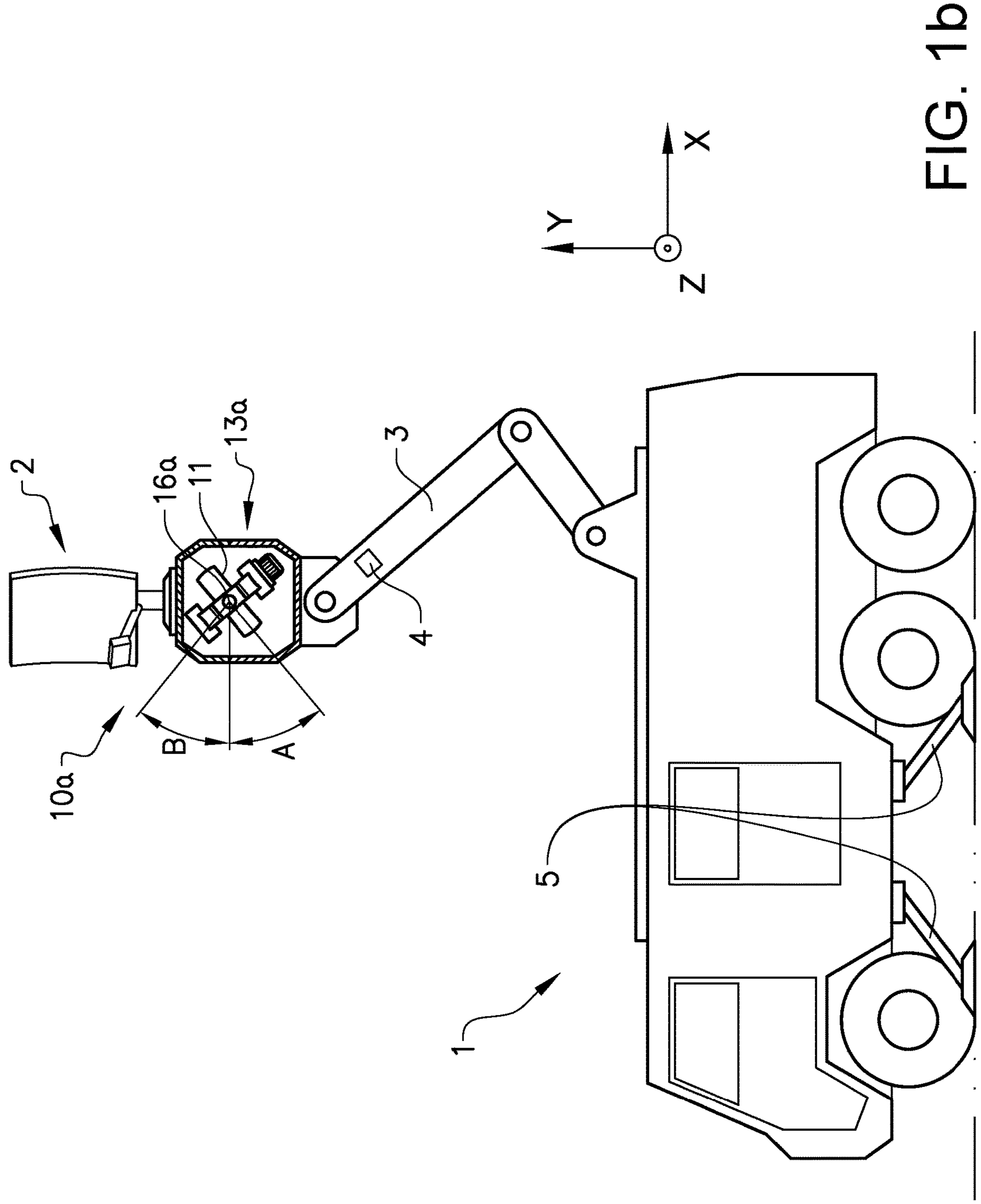

In FIG. 1*a* the flywheel 11 is arranged in a first position in which the flywheel 11 is essentially parallel to a horizontal plane extending in the direction of the X-axis. This position is herein referred to resting position. FIG. 1*b* discloses a second schematic view of a vehicle 1 provided with a first exemplary embodiment of a stabilization arrangement 10*a*, wherein in FIG. 1*b* the flywheel 11 is tilted an angle A around the first gimbal output axis 16*a*, referred to as inclination angle, in relation to the position of the flywheel 11 of FIG. 1*a*.

Please note that the suspended flywheel 11 is also capable of tilting in a direction opposite to A as is indicated by the inclination angle B.

The stabilization arrangement 10*a* may be either passive or actively regulated. For a passive stabilization arrangement the gyro effect alone provided by the spinning flywheel 11 suspended in the gimbal structure 13*a* counteracts the movements of the antenna mast 3. The flywheel 11 is configured to tilt freely around the first gimbal output axis 16*a*, as is indicated by the inclination angles A and B of FIG. 1*b*. Tilting the flywheel 11 has the effect that the stabilizing effect provided by the stabilization arrangement 10*a* may be even more significant, thus lateral movements of the antenna mast may be even more efficiently counteracted.

For active control of an actively regulated stabilization arrangement e.g. input from the sensor 4, such as an accelerometer or an anemometer, can be used to further enhance the dampening gyro effect provided by the spinning flywheel 11 of the stabilization arrangement 10*a*. The active control may also be based on other input such as the rate of rotation of the rotatable radar surface 2. By controlling the movements, i.e. the tilting, of the flywheel 11 around the first gimbal output axis 16*a*, as is disclosed in FIG. 1*b*, the effect of the gyro effect equalizing forces acting against the movements of the antenna mast 3 may be actively supported, whereby the dampening effect will be improved. This will further prevent the antenna mast 3 form going into self-oscillation.

The movements of the flywheel 11 around the first gimbal output axis 16*a* can be controlled by means of a motor device (not visible in FIGS. 1*a* and 1*b*). It may also be possible to control the movements of the flywheel 11 around the first gimbal output axis 16 by means of a precession brake (not visible in FIGS. 1*a* and 1*b*), singly or in combination with a motor device.

However, during certain circumstances, such as e.g. at varied and unpredictable wind gusts giving rise to fast and rapidly changing transients, passively regulated stabilization arrangement may be preferable.

Please note that the stabilization arrangement 10*a* according to FIG. 1*a* and FIG. 1*b* is necessarily not depicted according to scale. FIG. 1*a* and FIG. 1*b* is first and foremost provided in order clearly disclose a first exemplary embodiment of a stabilization arrangement 10*a* according to the present invention. In FIG. 1*b* the sensor 4 is differently positioned than in FIG. 1*a*. In FIG. 1*a* is also an exemplary positioning of a schematically indicated gyroscopic stabilizer failure warning device 40 disclosed.

Figure 2B:
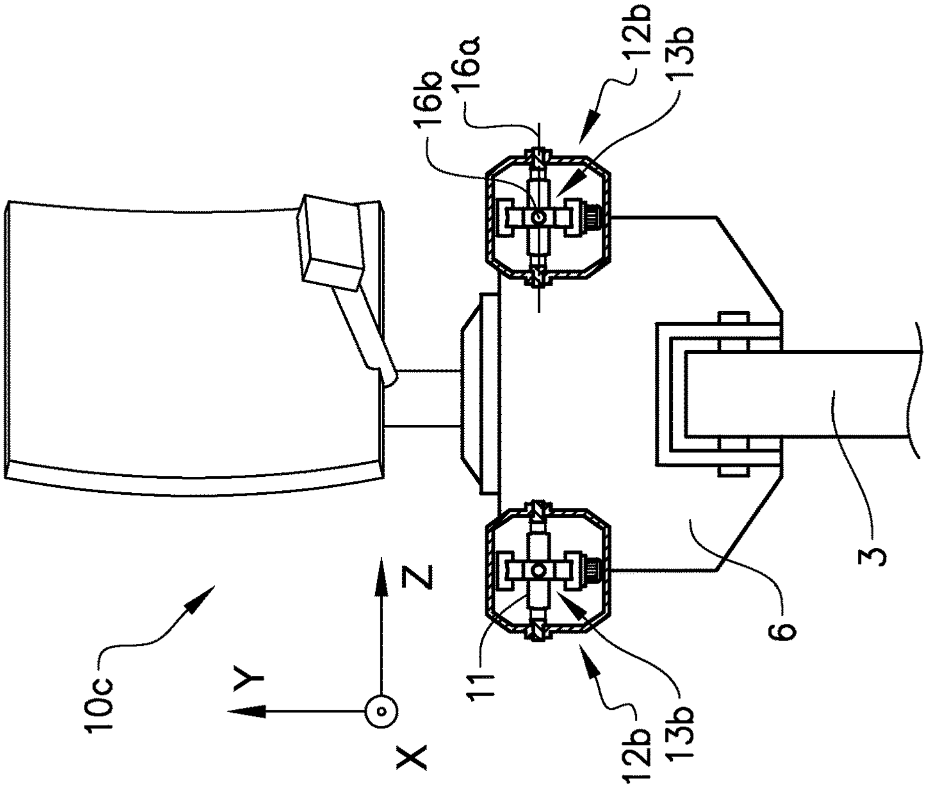
Figure 2A:
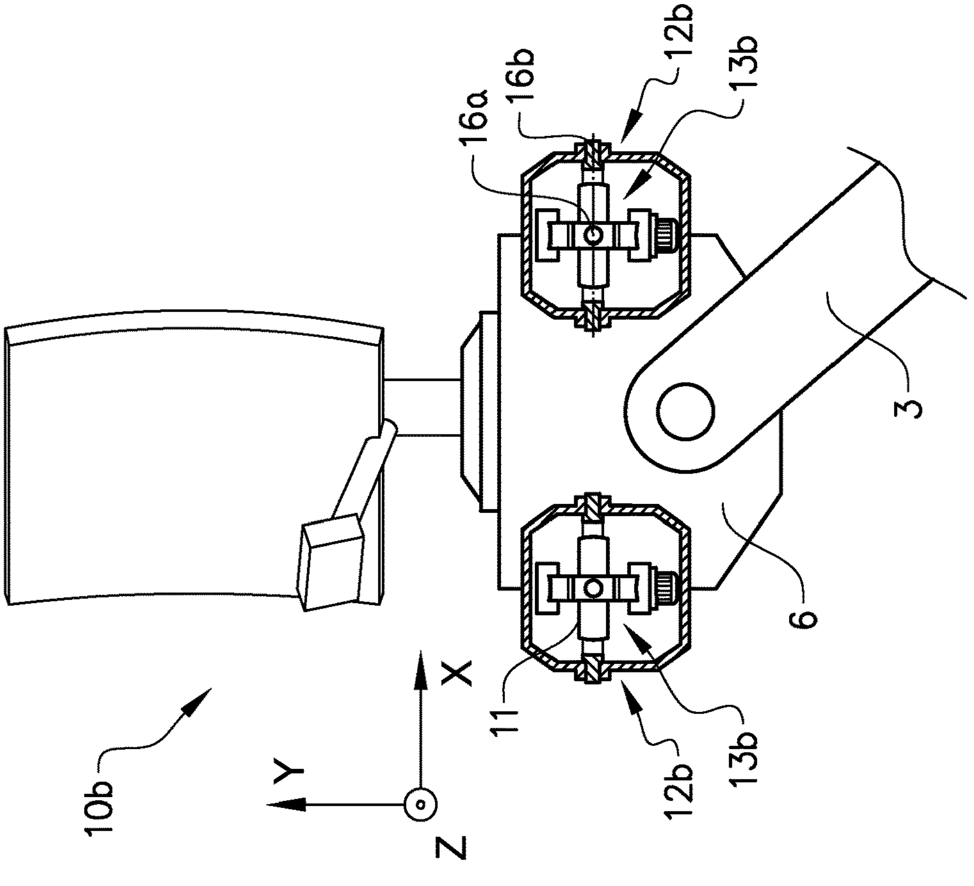
Figure 2C:
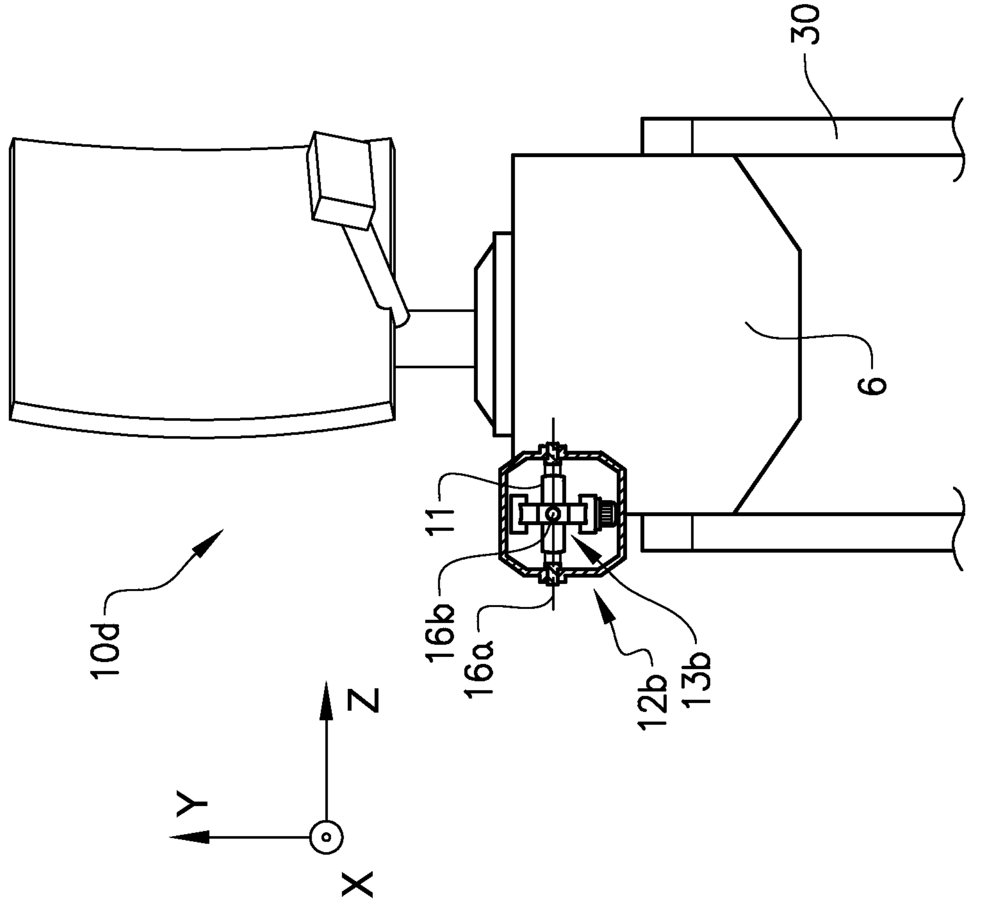

FIG. 2*a*, FIG. 2*b* and FIG. 2*c* disclose schematic views of exemplary embodiments of stabilization arrangements 10*b*, 10*c*, 10*d*.

The stabilization arrangement 10*b* according to FIG. 2*a* comprises two gyroscopic stabilizer devices 12*b*, one arranged at a first side in X-direction of the connection arrangement 6, and one arranged at a second side in X-direction of the connection arrangement 6.

The stabilization arrangement 10*c* according to FIG. 2*b* also comprises two gyroscopic stabilizer devices 12*b*, one arranged at a first side in Z-direction of the connection arrangement 6, and one arranged at a second side in Z-direction of the connection arrangement 6.

The stabilization arrangement 10*d* according to FIG. 2*c* comprises just one gyroscopic stabilizer device 12*b*, arranged at one side in Z-direction of the connection arrangement. Please note that in FIG. 2*b* the antenna mast 3 is comprises just one leg, which is the most common embodiment of the antenna masts disclosed herein. In FIG. 2*c* is however also shown that the antenna mast 30 may comprises two legs.

FIG. 2*a*, FIG. 2*b* and FIG. 2*c*, together with FIG. 1*a*, are intended to clarify that the number of, and positioning of, gyroscopic stabilizer devices 12 of a stabilization arrangement 10 according to the present invention may be different for different embodiments. What determines the number of, and positioning of, gyroscopic stabilizer devices 12 is e.g. the current implementation of the stabilization arrangement 10, which e.g. is decisive for weight and volume restrictions, cost, required performance of the radar antenna and first and foremost the configuration, e.g. in terms of flywheel size/weight and flywheel spin velocity. All embodiments explicitly disclosed herein, and also other implicitly disclosed embodiments which are obvious for the skilled person when consulting the herein presented information, are considered to the within the scope of the present invention.

The gimbal structures 13*b* of FIG. 2*a*, FIG. 2*b* and FIG. 2*c* all have two degrees of freedom (2 DOF), wherein respective gimbal structure 13*b* has a first gimbal output axis 16*a* and a second gimbal output axis 16*b*. For FIG. 2*a* the first gimbal output axis 16*a* is directed in parallel to the Z-axis, perpendicular to Y-axis and an indicated X-axis, and is therefore just indicated by a circle. The second gimbal output axis 16*b* is directed in parallel to the X-axis and perpendicular to the Y-axis. For FIG. 2*b* and FIG. 2*c* the first gimbal output axis 16*a* is directed in parallel to the Z-axis, perpendicular to Y-axis and an indicated X-axis. The second gimbal output axis 16*b* is directed in parallel to the X-axis and perpendicular to the Y-axis, and is therefore just indicated by a circle. The 2 DOF gimbal structure 13*b* will be disclosed more in detail below and in relation to FIG. 4*a* and FIG. 4*b*.

In accordance to FIG. 1*a* and FIG. 1*b*, please note that neither the stabilization arrangements 10*b*, 10*c*, 10*d* of FIG. 2*a*, FIG. 2*b* and FIG. 2*c* necessarily are depicted according to scale.

For 2 DOF stabilization arrangements 10*b*, 10*c*, 10*d* the suspended flywheel 11 is free to move around, what herein generally is referred to as tilt or precession, both the first gimbal output axis 16*a* and the second gimbal output axis 16*b*. A rotating suspended flywheel 11 will always strive to be essentially horizontally oriented, and in a 2 DOF system the flywheel 11 can compensate for movements of the structure to which the stabilization arrangement stabilization arrangement 10*b*, 10*c*, 10*d* comprising the flywheel 11 is arranged, in two directions.

In a 1 DOF stabilization arrangement system the flywheel 11 will only be able to compensate for movements in one direction, the direction perpendicular to the gimbal output axis of the 1 DOF system.

The stabilizing effect due to the gyro effect provided by the stabilization arrangements 10*b*, 10*c*, 10*d* is most effective when the flywheel 11 of the stabilization arrangements 10*b*, 10*c*, 10*d* is rotating essentially in the horizontal plane.

The 2 DOF stabilization arrangements 10*b*, 10*c*, 10*d* may either be passive systems or actively controlled systems. Actively controlled systems may be preferable during certain conditions since by actively controlling the tilting of the flywheel 11 around a gimbal output axis the stabilizing or dampening gyro effect provided by the spinning flywheel 11 possibly can be enhanced. However, during other conditions, such as at varied and unpredictable wind gusts giving rise to fast and rapidly changing transients, a passive system might actually be preferable. A passive system, without the need of sensors, may e.g. be less expensive. Active control is preferably enabled by means of using input from a sensor, such as e.g. an accelerometer or an anemometer.

Figure 3B:
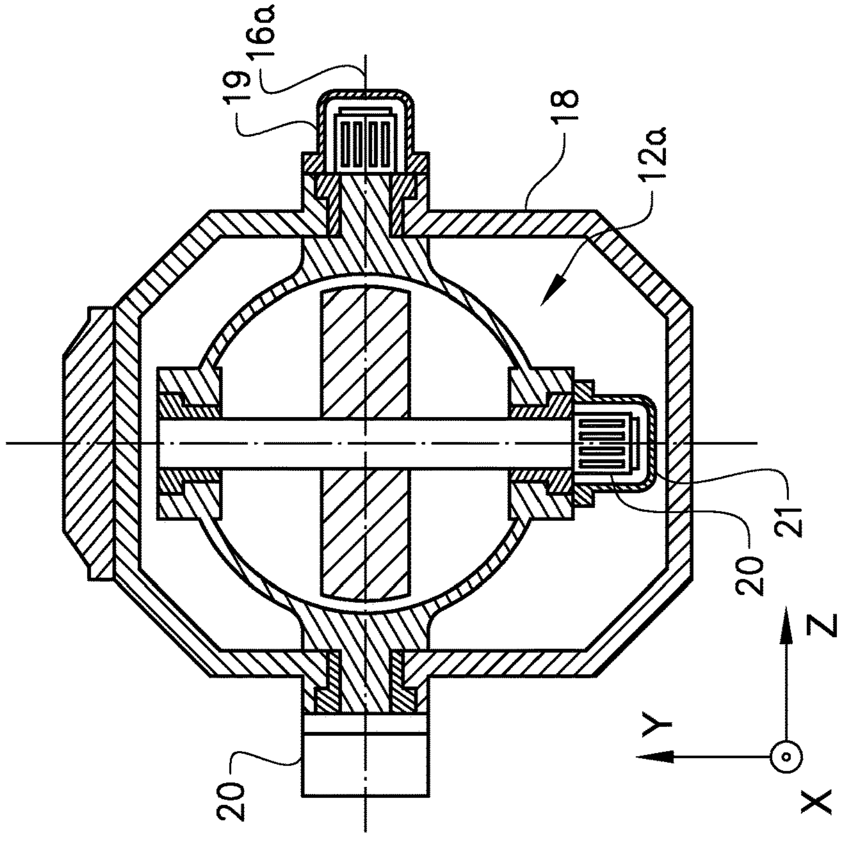

As will be discussed more in detail later on, and as e.g. is shown in FIG. 3*b*, the active control is enabled by means of a motor device, such as a servomotor or a hydraulic motor, and possibly also by means of a precession brake.

At least one of the first gimbal output axis 16*a* and second gimbal output axis 16*b* may further be provided with a locking and unlocking functionality (not visible). The locking functionality is configured to lock the tilting of the suspended flywheel 11 around respective gimbal output axis 16*a*, 16*b*. Prevent the flywheel 11 from tilting around the first and/or second gimbal output axes 16*a*, 16*b* can e.g. be desirable during transport or when the antenna mast is raised or lowered.

Figure 3A:
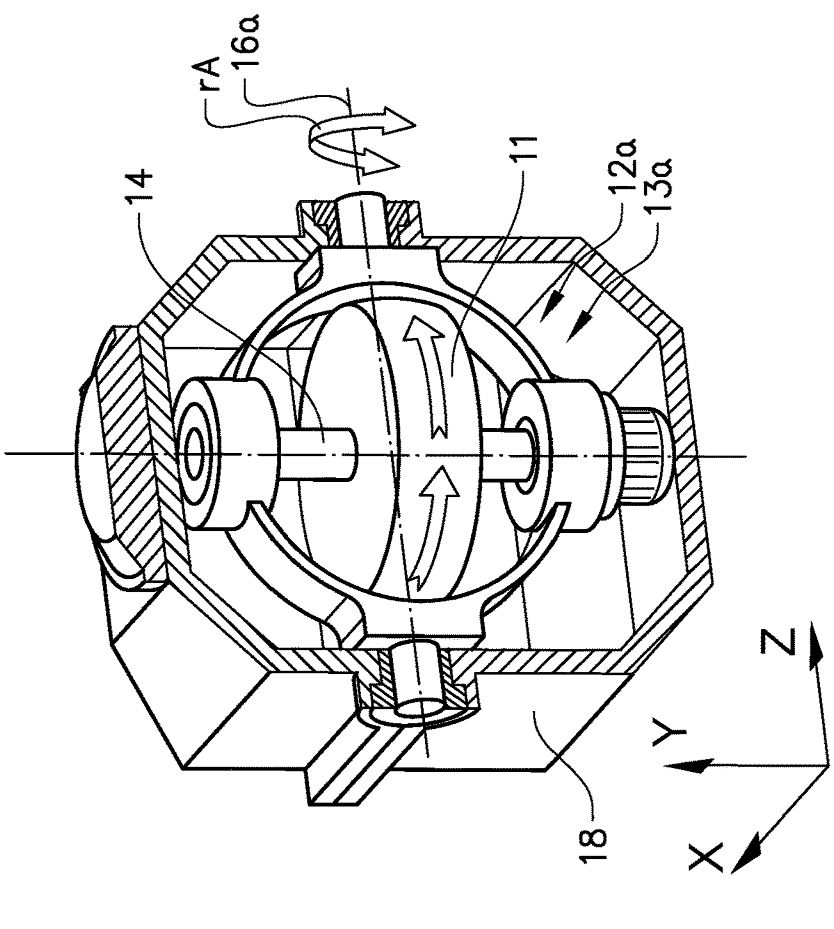

Referring now to FIG. 3*a* and FIG. 3*b*, disclosing schematic views of an exemplary embodiment of a 1 DOF gyroscopic stabilizer device 12*a*. FIG. 3*a* shows a 3D image disclosing a gyroscopic stabilizer device 12*a* comprising a flywheel 11, arranged to spin around a flywheel axis 14, and a 1 DOF gimbal structure 13*a*, having a first gimbal output axis 16*a*. The flywheel 11 is suspended in the 1 DOF gimbal structure 13*a* whereby the suspended flywheel 11 can be tilted around the first gimbal output axis 16*a*, as is indicated by the possible inclination angle range rA, disclosing how the suspended flywheel 11 is tiltable around the first gimbal output axis 16*a*.

FIG. 3*b* shows the gyroscopic stabilizer device 12*a* arranged in a housing 18 from a cutaway side view. The gyroscopic stabilizer device 12*a* according to FIG. 3*b* is an actively controlled gyroscopic stabilizer device 12*a* provided with a motor device 19 and a precession brake 20. The motor device 19 can be used to actively control the gyro effect provided by the gyroscopic stabilizer device 12*a* by rotating the gyroscopic stabilizer device 12*a* around the first gimbal output axis 16*a* whereas the precession brake 20 can be used to actively control the gyro effect provided by the gyroscopic stabilizer device 12*a* by braking the rotation of the gyroscopic stabilizer device 12*a* around the first gimbal output axis 16*a*.

According to the schematic view of the gyroscopic stabilizer device 12*a* of FIG. 3*b* the flywheel drive motor 15 is arranged at one end of the flywheel axis 14 and includes a stator 21 fastened to the enclosure and a rotor 20 fastened to the flywheel axis 14. However, various forms of motors may be used as the flywheel drive motor 15.

The exemplary embodiment of FIG. 3*b* is provided with both a motor device 19 and a precession brake 20, but a system provided with either just a motor device 19 or a precession brake 20 will also be an actively controlled system, however, at least if just provided with a precession brake 20, to a lesser extent. The motor device 19 may e.g. be a servomotor or a hydraulic motor.

The rotation of the flywheel 11 around the first gimbal output axis 16*a*, thus the orientation of the flywheel 11, affects the dampening gyro effect provided by the spinning flywheel 11. Thus, by controlling the orientation of the flywheel 11 the dampening effect the gyroscopic stabilizer device 12*a* has on movements or oscillations, such as self-oscillation, of the antenna mast can be enhanced. How the motor device 19 and/or the precession brake 20 are used to actively control the orientation of the flywheel 11 may be based on input from a sensor such as an accelerometer or an anemometer.

Figure 4B:
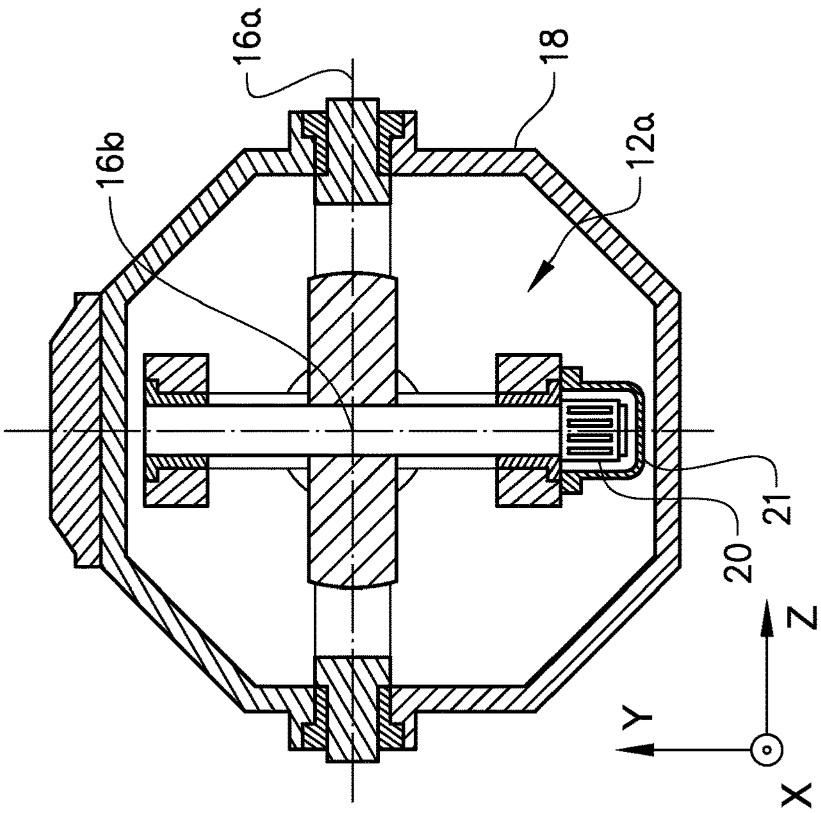
Figure 4A:
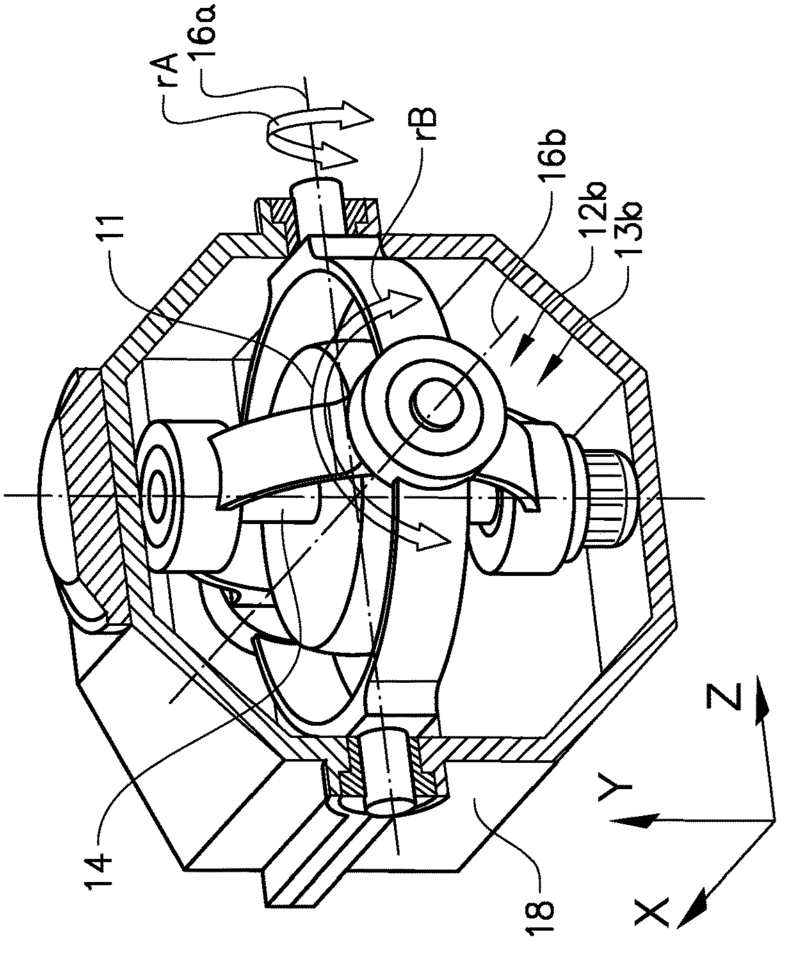

FIG. 4*a* and FIG. 4*b*, discloses schematic views of an exemplary embodiment of a 2 DOF gyroscopic stabilizer device 12*b*. FIG. 4*a* shows a 3D image disclosing a gyroscopic stabilizer device 12*b* comprising a flywheel 11, arranged to spin around a flywheel axis 14, and a 2 DOF gimbal structure 13*b*, having a first gimbal output axis 16*a* and a second gimbal output axis 16*b*. The flywheel 11 is suspended in the 2 DOF gimbal structure 13*b* whereby the suspended flywheel 11 can be tilted around the first gimbal output axis 16*a* and around the second gimbal output axis 16*b*, as is indicated by the possible inclination angle range rA, disclosing how the suspended flywheel 11 is tiltable around the first gimbal output axis 16*a*, and as is indicated by the possible inclination angle range rB, disclosing how the suspended flywheel 11 is tiltable around the second gimbal output axis 16*b*.

FIG. 4*b* shows the gyroscopic stabilizer device 12*b* from a cutaway side view. The difference between the gyroscopic stabilizer device 12*a* of FIG. 3*b* and of the gyroscopic stabilizer device 12*b* of FIG. 4*b* is that for a 2 DOF gyroscopic stabilizer device the spinning flywheel 11 is tiltable around both first gimbal output axis 16*a* and a second gimbal output axis 16*b*, which provides possibility to counteract movements of the antenna mast both in, using the coordinate system indicated in FIGS. 4*a* and 4*b* respectively, X-direction and Z-direction.

As previously discussed, the rotation of the flywheel 11 around the first gimbal output axis 16*a* and the second gimbal output axis 16*b*, thus the orientation of the flywheel 11, affects the dampening gyro effect provided by the spinning flywheel 11.

The exemplary embodiments of gyroscopic stabilizer devices 12*a*, 12*b* disclosed in FIG. 3*a*, FIG. 3*b*, FIG. 4*a* and FIG. 4*b* examples of how the gyroscopic stabilizer device of a stabilization arrangement according to the present invention may be configured, and FIGS. 3*a*, 3*b*, 4*a* and 4*b* are necessarily not depicted to scale.

The invention claimed is:

1. A stabilization arrangement (10) for stabilizing an antenna mast (3), comprising an antenna mast (3), and a gyroscopic stabilizer device (12) comprising:

- a flywheel (11),
- a flywheel axis (14), wherein the flywheel (11) is rotatably arranged about the flywheel axis (14), and
- a gimbal structure (13), wherein:

- the flywheel (11) and the flywheel axis (14) are suspended in the gimbal structure (13),
- the suspension of the flywheel (11) and the flywheel axis (14) in the gimbal structure (13) permits flywheel precession about at least one gimbal output axis (16) different than the flywheel axis (14),
- the gyroscopic stabilizer device (12) is fixedly arranged in connection to a first end portion (31) of the antenna mast (3) and the antenna mast (3) is fastenable to a supporting structure at a second end portion (32) of the antenna mast (3), and
- the gyroscopic stabilizer device (12) is configured to reduce movements in a plane perpendicular to the extension of the antenna mast (3).

2. A stabilization arrangement (10) according to claim 1, wherein, when the flywheel (11) suspended in the gimbal structure (13) is in a resting position, the longitudinal direction of the flywheel axis (14) is essentially vertically directed, and the flywheel (11) is arranged to rotate perpendicularly thereto.

3. A stabilization arrangement (10*b*, 10*c*, 10*d*) according to claim 1, wherein the gimbal structure (13*b*) is configured to permit flywheel precession about two gimbal output axes (16*a*, 16*b*).

4. A stabilization arrangement (10) according to claim 1, wherein the at least one gimbal output axis (13) is provided with locking and unlocking functionality.

5. A stabilization arrangement (10) according to claim 1, wherein the at least one gimbal output axis (16*a*) is provided with a motor device (19) connected to the gimbal output axis (16*a*), whereby by means of the motor device (19) the precession about the gimbal output axis (16*a*) may be actively controlled.

6. A stabilization arrangement (10) according to claim 5, wherein the active control of the precession about the gimbal output axis (16*a*), by means of the motor device (19), is based on sensor input.

7. A stabilization arrangement (10*a*) according to claim 6, wherein the sensor input is provided by means of a sensor (4), wherein the sensor (4) used is an accelerometer or an anemometer.

8. A stabilization arrangement (10*a*) according to claim 6, wherein the sensor (4) is arranged at the antenna mast (3).

9. A stabilization arrangement (10) according to claim 5, wherein the active control enabled by means of the motor device (19) and at least one sensor (4) is configured to actively counteract that the antenna mast (3) oscillates.

10. A stabilization arrangement (10) according to claim 5, wherein the antenna mast (3) is provided with a rotating radar surface (2), and wherein the motor device (19) is configured to be controlled in direct proportion to the rate of rotation of the rotating radar surface (2).

11. A stabilization arrangement (10) according to claim 5, wherein the antenna mast (3) is provided with a rotating radar surface (2), and wherein the stabilization arrangement (10) is provided with a sensor (4) in form of an anemometer (4), and wherein

- the motor device (19) is configured to be controlled by taking into account:
  - the rate of rotation of the rotating radar surface (2), and the wind speed measured by means of the anemometer (4).

12. A stabilization arrangement (10) according to claim 1, wherein the gyroscopic stabilizer device (12) further comprises a housing (18), wherein the housing (18) is configured to at least partly enclose the flywheel axis (14), the flywheel (11) and the gimbal structure (13).

13. A stabilization arrangement (10) according to claim 1, wherein the stabilization arrangement (10) further is provided with a gyroscopic stabilizer failure warning device (40), wherein the gyroscopic stabilizer failure warning device (40) is configured to detect if the operations of the gyroscopic stabilizer device (12) fails.

14. A method for counteracting oscillations of an antenna mast (3), wherein the antenna mast (3) is provided with a stabilization arrangement (10) according to claim 7, and wherein the method comprises the method steps of:

collecting sensor data by means of the sensor (4), determining how precessive torque can be applied to at least one gimbal output axis (16) in order to counteract that the antenna mast (3) oscillates based on collected sensor data, and applying determined precessive torque to the at least one gimbal output axis (16) by means of the motor device (19), whereby oscillations of the antenna mast (3) is counteracted.

15. A method for counteracting oscillations of an antenna mast (3), wherein the antenna mast (3) is provided with a stabilization arrangement (10) according to claim 5, wherein the antenna mast (3) is provided with a rotating radar surface (2), and wherein the method comprises the method steps of:

collecting information regarding the current rate of rotation of the rotating radar surface (2), and controlling the motor device (19) in direct proportion to the rate of rotation of the rotating radar surface (2) by applying precessive torque to the at least one gimbal output axis (16) by means of the motor device (19), whereby oscillations of the antenna mast (3) is counteracted.

16. A method for counteracting oscillations of an antenna mast (3), wherein the antenna mast (3) is provided with a stabilization arrangement (10) according to claim 7, wherein the antenna mast (3) is provided with a rotating radar surface (2), and wherein the stabilization arrangement (10) is provided with a sensor (4) in form of an anemometer, and wherein the method further comprises the additional method steps of:

measuring the current wind speed by means of the anemometer, and controlling the motor device (19) in proportion to the rate of rotation of the rotating radar surface (2) and the current wind speed by applying precessive torque to the at least one gimbal output axis (16) by means of the motor device (19), whereby oscillations of the antenna mast (3) is counteracted.

17. A gyroscopic stabilizer device (12) for use in a stabilization arrangement (10), the stabilization arrangement (10) comprising an antenna mast (3) and the gyroscopic stabilizer device (12), the gyroscopic stabilizer device (12) being fixedly arranged directly to, or in connection to, the antenna mast (3), the gyroscopic stabilizer device (12) comprising:

a flywheel (11), a flywheel axis (14), wherein the flywheel (11) is rotatably arranged about the flywheel axis (14), a flywheel drive motor (19), wherein the flywheel drive motor (19) is configured to spin the flywheel (11) around the flywheel axis (14), and a gimbal structure (13), wherein the gimbal structure (13) permits flywheel precession about at least one gimbal output axis (16) different than the flywheel axis (14), wherein:

the gyroscopic stabilizer device (12) is arranged at a first end portion (31) of the antenna mast (3) and the antenna mast (3) is fastenable to a structure at a second end portion (32) of the antenna mast (3), and the gyroscopic stabilizer device (12) is configured to reduce movements in a plane perpendicular to the extension of the antenna mast (3).

18. A stabilization arrangement (10) for stabilizing an antenna mast (3), comprising an antenna mast (3), and a gyroscopic stabilizer device (12) comprising:

a flywheel (11), a flywheel axis (14), wherein the flywheel (11) is rotatably arranged about the flywheel axis (14), and a gimbal structure (13), wherein:

the flywheel (11) and the flywheel axis (14) are suspended in the gimbal structure (13), the gimbal structure (13) is configured to permit flywheel precession about at least one gimbal output axis (16), the gyroscopic stabilizer device (12) is fixedly arranged in connection to a first end portion (31) of the antenna mast (3) and the antenna mast (3) is fastenable to a supporting structure at a second end portion (32) of the antenna mast (3), the gyroscopic stabilizer device (12) is configured to reduce movements in a plane perpendicular to the extension of the antenna mast (3), and the at least one gimbal output axis (13) is provided with locking and unlocking functionality.

* * * * *